Jan. 16, 1968 R. W. HODGSON ET AL 3,363,303
WEATHERSTRIP MOUNTING HAND TOOL
Filed Aug. 26, 1965 2 Sheets-Sheet 1
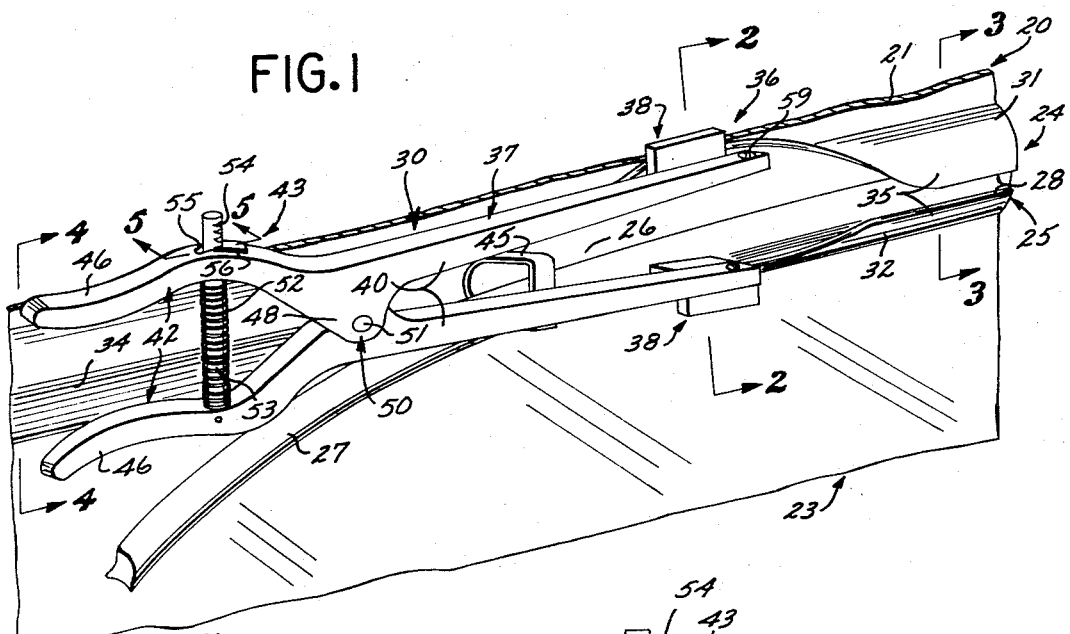
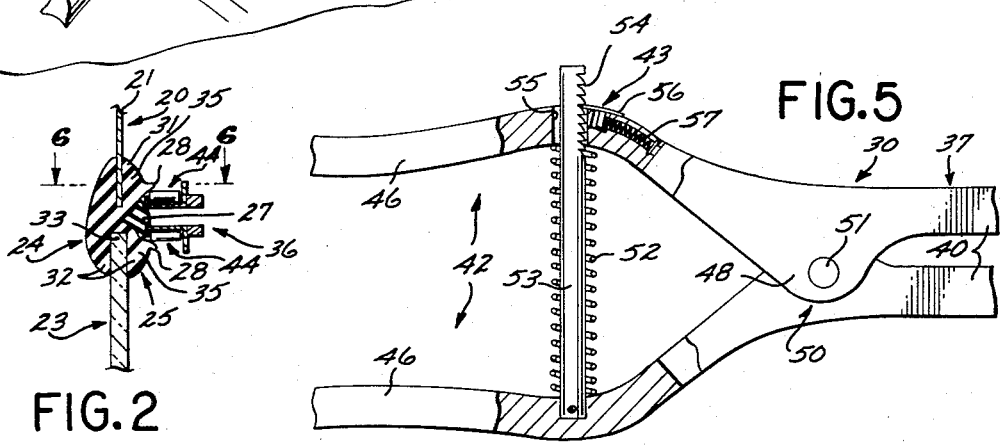
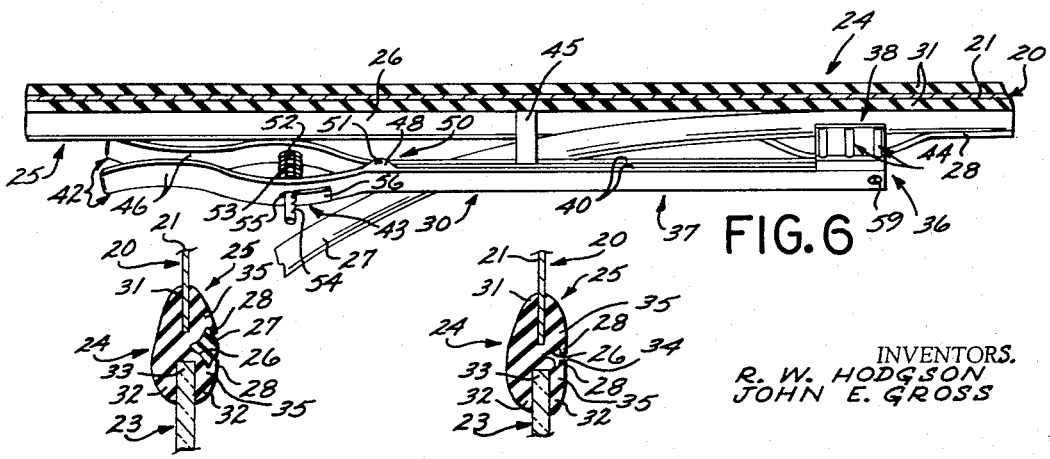
INVENTORS.
R. W. HODGSON
JOHN E. GROSS Jan. 16, 1968  R. W. HODGSON ET AL  3,363,303
WEATHERSTRIP MOUNTING HAND TOOL
Filed Aug. 26, 1965  2 Sheets-Sheet 2
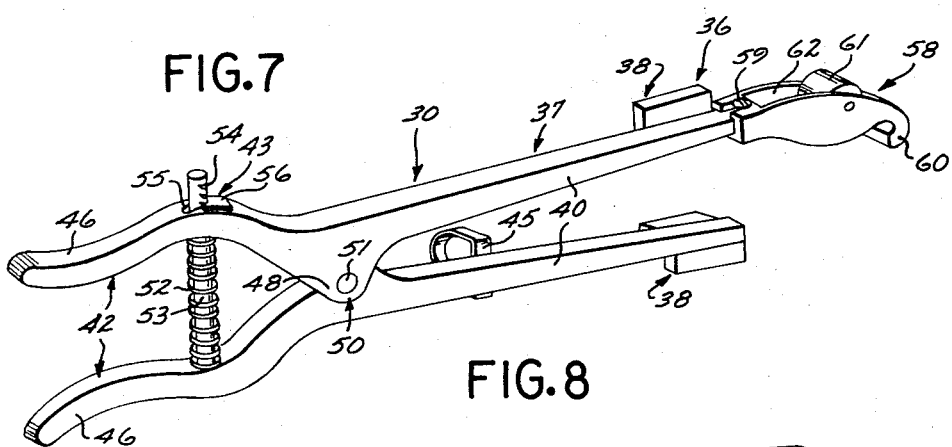
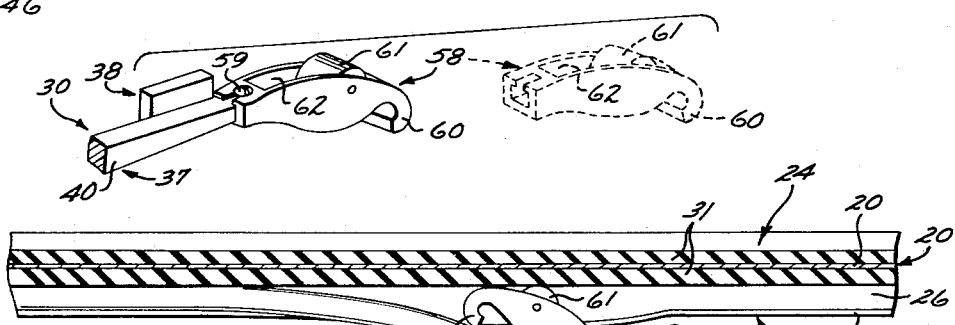
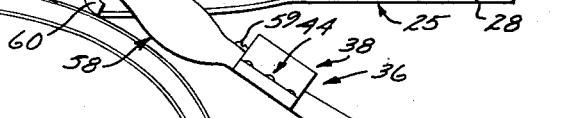
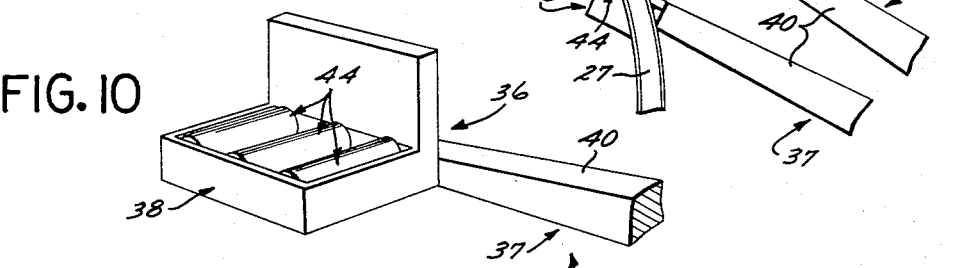
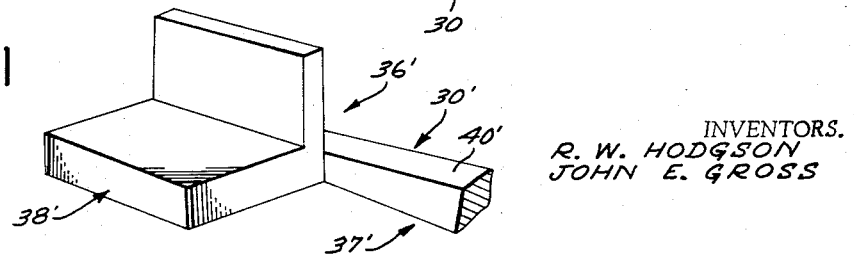
INVENTORS.
R. W. HODGSON
JOHN E. GROSS United States Patent Office 3,363,303
Patented Jan. 16, 1968

3,363,303
WEATHERSTRIP MOUNTING HAND TOOL
Robert W. Hodgson, 3406 W. Washington Blvd., and John E. Gross, c/o P.O. Box 18992, both of Los Angeles, Calif. 90018
Filed Aug. 26, 1965, Ser. No. 482,713
4 Claims. (Cl. 29—235)

ABSTRACT OF THE DISCLOSURE

The specification discloses a weatherstrip mounting hand tool which, in certain forms thereof, is also shown as comprising a weatherstrip demounting hand tool. The tool is provided with spreader means including two movably opposed spreader blades initially positioned in closely adjacent relationship for insertion into an interior locking and spreader slot positioned between and defined by a channel-shaped part of an elastomeric mounting female weatherstrip portion for subsequent forcible separation of the channel-shaped part whereby to open the interior locking and spreader slot for the forcible insertion thereinto of a correspondingly shaped male weatherstrip portion which effectively comprises a spreader element adapted to maintain the interior locking and spreader slot and the channel-shaped part in a spread-apart relationship. The specification also discloses the hand tool as having mounting means movably mounting the opposed spreader blades for movement between an initial closely adjacent relationship thereof, which comprises a blade-inserting position, into a final spread-apart position for forcibly opening up the normally closed interior locking and spreader slot of the female weatherstrip portion. The specification discloses the mounting means as being provided with controllably manually operable actuating means for actuating the mounting means and the spreader blades carried thereby between the above-mentioned initial blade-inserting position and final spread-apart position. The specification discloses a preferred form of the spreader blades as being provided with exteriorly positioned antifriction roller means mounted for movement about axes directed substantially transversely with respect to the longitudinal direction of the tool and substantially parallel to a transverse direction of the spreader blades. The specification also discloses a preferred form of the tool as having spring biasing means normally effectively biasing the spreader blades into the above-mentioned initial blade-inserting position, but effectively cooperable therewith in a manner such as to allow forcible spreading apart movement thereof toward the above-mentioned final spread-apart position in response to forcible manual operation of the actuating means in a corresponding manner. The specification also discloses a preferred form of the tool as having controllably releasable and disengageable locking means effectively cooperable with respect to the mounting means and the actuating means thereof for effectively locking the spreader blades in the final spread-apart position referred to above until manual releasing and disengagement thereof. Also, the specification discloses one preferred form of the invention wherein it also effectively comprises a weatherstrip demounting hand tool, as including at the forward end of one of said mounting members beyond the corresponding spreader blade a weatherstrip-removing hook means.

Generally speaking, the present invention relates to the hand tool art and, more particularly, pertains to a hand tool adapted primarily for use in mounting elastomeric weatherstripping, such as around the edge of windows or the like whereby to effectively seal same. In one specific form of the invention, it may also be adapted for dismounting the elastomeric weatherstripping when desired.

While the tool may be used for mounting and/or dismounting elastomeric weatherstripping at virtually any desired location, one particular application thereof for which the tool is especially well adapted is the insertion of an elastomeric male weatherstrip element or portion into a resiliently normally closed female channel-shaped weatherstrip element or portion which initially somewhat loosely engages a window frame and a window in a bus or coach whereby to effectively firmly fasten and sealingly engage same together. However, it should be understood that the invention is not specifically so limited, but may be employed for mounting male weatherstripping in normally closed female weatherstripping under a variety of conditions, locations, and circumstances of use. Also, the hand tool may include weatherstrip-removing hook means for use in quickly and easily removing the male weatherstripping from within the resiliently encompassing channel-shaped female weatherstripping normally holding same after installation. Thus, the tool can be used for quickly and easily mounting the male weatherstripping in the female channel-shaped weatherstripping or dismounting it therefrom as desired—either of these operations being very much simpler and quicker through the use of the present tool than when done in the customary prior art manner and, therefore, making it possible for one worker to install and/or remove a much greater quantity of weatherstripping in a given time and with much less difficulty than has heretofore been the case. This may be necessary for removal of the window glass for replacement and/or cleaning in many instances and, therefore, is a frequently performed operation, particularly with reference to public transportation vehicles such as motor coaches, busses, and the like, although not specifically so limited. It should be noted that when used for the purpose just mentioned, the normally closed female channel-shaped weatherstrip referred to hereinbefore normally has edge channel portions on opposite side edges from each other and positioned at substantially ninety degree displaced locations from a normally closed female channel of said channel-shaped weatherstrip which effectively acts as what might be termed a spreader or locking channel. The arrangement is such that said two oppositely positioned edge channels receive therein corresponding edges of a mounting frame (usually of thin-sheet material) and an edge of a glass or plastic window, respectively, which receiving engagement with said frame edge and said window edge becomes positively locked when said elastomeric male weatherstrip (which may be said to comprise a locking spreader element) is forced into said normally closed female spreader or locking channel or slot. This is a particularly advantageous arrangement for providing a completely sealed elastomeric edge mounting for a window panel or any other panel within an aperture defined within an exterior frame portion of another thin-sheet member which is usually metal, although not specifically so limited.

For example, it will be understood that the thin-sheet metal of a bus sidewall, may merely have a slightly oversize window aperture or hole cut thereinto, with no finishing of the edges of said metal immediately around the aperture being required, and said unfinished, roughly oversize cut edges may then be said to comprise a frame means, or a frame edge, which can be locked with respect to one (usually the outside one) of said edge channels of said female weatherstrip means while the opposite channel edge thereof may be similarly locked with respect to a corresponding edge of a pane of glass, transparent plastic, or the like, comprising a window panel and which may also be merely rough-cut to a size slightly less than said aperture formed within said sidewall of the bus and defining said frame means.

In other words, no careful finishing of edges of the window or edges of the frame cut in the sidewall of the bus are necessary, and the elastomeric female weatherstrip means will compensate for all slight variations in said frame edge and window edge portions and will elastically mount them with respect to each other in completely sealed relationship when the male weatherstrip element or spreader element is forced into the normally closed, perpendicularly positioned female channel—this having the effect of forcibly resiliently tending to close said opposite edge channels whereby to firmly lock them on corresponding frame edge portions and window edge portions.

Throughout this application, when reference is made to the male and female weatherstrip or weatherstrip means and the sealed mounting of the window with respect to a window frame, it is to be understood as being of the exemplary type referred to above in some detail, although not specifically limited to the exact arrangement described in detail hereinabove. Actually, a great variety of different types of thin-sheet members, whether windows and frame or otherwise, may be mounted in substantially coplanar relationship by the type of weatherstrip means referred to above, and this may be very expeditiously done through the use of the novel weatherstrip mounting hand tool of the present invention, which in one form may be primarily a mounting tool while in another exemplary form may also comprise a dismounting tool.

It is an object of the present invention to provide a novel weatherstrip mounting hand tool of the character referred to above which is so arranged as to very simply and easily spread apart the normally resiliently closed channel-shaped portion of a female outer weatherstrip element and to maintain it open as the tool is drawn along the length thereof whereby to facilitate the quick and easy insertion thereinto of a correspondingly shaped male weatherstrip portion.

It is a further object to provide a novel weatherstrip mounting hand tool of the character referred to in the preceding object wherein the spreading-apart operation of the normally resiliently closed channel-shaped parts of the female weatherstrip portion is accomplished by initially closely adjacent, but controllably manually separable, spreader means consisting of opposed spreader blades provided on outer surfaces thereof with anti-friction roller means mounted for rolling friction-minimizing contact along inside surfaces of the spread-apart channel-shaped parts of the female weatherstrip portion whereby to facilitate easy movement therealong while holding said parts open to facilitate the quick and easy insertion of a male weatherstrip portion thereinto.

It is a further object to provide a weatherstrip mounting hand tool of the character referred to above wherein the controllably separable spreader blade means are carried by mounting means for movement between an initial closely adjacent contiguous coextensive blade-inserting position where they together define said spreader means into said spread-apart position for opening up said closed channel-shaped female weatherstrip portion.

It is a further object to provide a novel weatherstrip mounting hand tool of the character referred to in the preceding object wherein said mounting means includes a first mounting portion carrying a first one of said spreader blades and a second mounting portion carrying a second one of said spreader blades, with said first and second mounting members being provided with pivotal connection means at a location spaced from said first and second spreader blades and having rear actuating extensions extending beyond said pivotal connection means and effectively comprising actuating means whereby said rearwardly projecting actuating extensions may be manually grasped and closed or opened for correspondingly moving said opposed first and second spreader blades oppositely between said initial closed position and said final spread-apart position and the reverse thereof respectively.

It is a further object to provide a novel weather-strip mounting hand tool of the character set forth in the preceding object wherein the mounting means and the actuating means comprise two substantially V-shaped members, each having an inwardly directed apex portion pivotally connected to the other apex portion and defining the pivotal connection means previously referred to whereby to produce an overall plier-like structure of a reverse operating type having each movable spreader blade and the rearwardly projecting actuating extension connected thereto lying on its own and the same side of the pivotal connection means (opposite to the other spreader blade and the other rearwardly projecting actuating extension connected thereto) whereby movement of said actuating extensions toward each other causes spreading-apart movement of said spreader blades and vice versa.

It is a further object to provide a novel weatherstrip mounting hand tool of the character referred to in the preceding object, including spring biasing means normally biasing said actuating extensions apart and biasing said spreader blades toward said initial closely adjacent installation or insertion position, but allowing forcible spreading-apart movement of said blades in response to forcible movement of said actuating extensions toward each other.

It is a further object to provide a novel weatherstrip mounting hand tool of the character referred to above which is additionally provided with weatherstrip removing hook means whereby to also comprise a weatherstrip dismounting hand tool.

It is a further object to provide a novel hand tool of the character referred to in any of the preceding objects which is of extremely simple, inexpensive, virtually foolproof construction such as to be conductive to widespread use thereof.

Further objects are implicit in the detailed description which follows hereinafter and which is to be construed as exemplary rather than limiting; said further objects being apparent to persons skilled in the art after a careful study of the detailed description which follows.

For the purpose of clarifying the nature of the present invention, one exemplary embodiment and a slight variation of the spreader means portion thereof, are illustrated in the hereinbelow-described figures of the accompanying drawings and are described in detail hereinafter.

FIG. 1 is a fragmentary three-dimensional, partially-broken-away view illustrating one exemplary form of the novel weatherstrip mounting hand tool of the present invention in actual operation in the act of spreading open a female receiving spreader channel or slot portion of a female weatherstrip means for the purpose of allowing the insertion into the spread-open female channel or slot portion of a corresponding male weatherstrip element or member, which may be said to comprise a spreader or locking member.

FIG. 2 is a view taken substantially along the plane indicated by the arrows 2—2 of FIG. 1.

FIG. 3 is a view similar to FIG. 2 but is taken along a different plane such as is indicated by the arrows 3—3 of FIG. 1 and illustrates the male and female weatherstrip portions in fully engaged relationship wherein they cooperate with each other in a manner such as to lock the edge channel portions, or bifurcated finger portions, of said female weatherstrip element firmly onto the corresponding frame edge and window edge portions.

FIG. 4 is another fragmentary sectional view similar to FIGS. 2 and 3 but is taken on a different plane substantially as indicated by the arrows 4—4 of FIG. 1 and with all portions of the hand tool and of the male and female weatherstrip means or portions behind the plane of the view removed for reasons of drawing simplicity and clarity.

FIG. 5 is an enlarged fragmentary view, partly in section and partly in elevation, taken substantially on the plane indicated by the arrows 5—5 of FIG. 1 and illustrates the linear locking ratchet arrangement for holding the tool in any desired partially open spreading relationship for effectively spreading open the female locking or spreader channel portion of the female weatherstrip element as the hand tool is slidably moved therealong in the manner illustrated in FIG. 1.

FIG. 6 is an enlarged fragmentary view taken substantially along the plane indicated by the arrows 6—6 of FIG. 2 and further illustrates the detailed operation of the hand tool during the spreading of the female locking or spreader channel portion of the female weatherstrip element by the novel hand tool of the present invention.

FIG. 7 is a three-dimensional pictorial view generally similar to FIG. 1 but illustrates a very slight modification wherein one of the spreader blade portions or members is effectively provided at its forward end with a controllably operatively positionable (and controllably removable when desired) weatherstrip removing hook means adapted primarily for weatherstrip dismounting use.

FIG. 8 is a fragmentary view showing at the left in solid lines the fastened weatherstrip removing hook means of FIG. 7 and showing in phantom at the right of FIG. 8 the disengaged and removed weatherstrip removing hook means.

FIG. 9 is a view similar in aspect to FIG. 6 but illustrates the modified form of the invention shown in FIGS. 7 and 8 wherein the weatherstrip removing hook means is employed for the purpose of facilitating the removal of the previously mounted male spreader type weatherstrip element from within the locking or spreader female channel or slot portion of the female weatherstrip means or element.

FIG. 10 is an enlarged three-dimensional perspective view of a typical one of the spreader blade members or means of the first form of the invention illustrated in FIGS. 1-6, and also of the second form of the invention illustrated in FIGS. 7-9, wherein the spreader blade member is provided with anti-friction roller means.

FIG. 11 is a view similar to FIG. 10 but illustrates a modified type of spreader blade member which does not have the roller type of anti-friction means as illustrated in detail in FIG. 10, and it should be understood that this type of spreader blade means may be employed in any of the forms of the invention in lieu of the specific type of spreader blade means having anti-friction roller means illustrated in FIG. 10.

Referring to the figures for exemplary purposes, a typical installation situation is fragmentarily illustrated in three-dimensional, partially-broken-away form in FIG. 1 and is illustrated in fragmentary cross-sectional form in FIGS. 2-4 inclusive. The typical installation situation illustrated in said figures is one where the weatherstrip installation operation is primarily for the purpose of providing a positive sealingly engaged mounting arrangement for mounting one or more window panels in the sidewall portion of a coach or bus body, although it should be clearly understood that the invention is not specifically so limited.

In said FIGS. 1-4 inclusive, a portion of a coach or bus body is fragmentarily shown and is generally designated by the reference numeral 20 and comprises an upper side portion near the junction of one sidewall 21 (shown fragmentarily) with a roof portion (not shown) where a row of normally closed upper windows is usually found in a conventional prior art coach or bus body. Each of said normally closed upper windows in such a conventional coach or bus body is normally positioned above a conventional manually open lower window (not shown) which is slidably carried in the sidewall 21 of the coach or bus shown fragmentarily at 20. One such normally closed conventional type upper side window of the type conventionally carried by coaches or buses in the sidewalls thereof is shown fragmentarily at 23— only the upper portion thereof being shown.

Each such upper window 23 is normally adapted to be loosely mounted in position with respect to the adjacent edge portion of the coach sidewall 21, which effectively defines what might be termed frame means or a frame edge and is adapted to be held in said position by one typical form of the weatherstripping means, such as is indicated generally at 24 in said FIGS. 1-4 and which is adapted to be effectively firmly locked with respect to both said sidewall frame edge 21 and the edge of the window 23 through the use of the novel weatherstrip mounting hand tool of the present invention in the manner illustrated in FIGS. 1 and 2.

In said exemplary first form of the invention illustrated, the weatherstrip means 24 comprises an outer channel-shaped female weatherstrip portion 25 which is adapted to resiliently receive within the hollow interior 26 thereof a correspondingly shaped male weatherstrip portion 27. It will be noted that prior to insertion of the male weatherstrip portion 27 into the female weatherstrip portion 25, said female weatherstrip portion 25 is normally substantially collapsed in a manner effectively closing the slot 26 defined between the edges 28 enclosing said slot meaans 26 and together effectively comprising the outer channel-shaped female weatherstrip portion 25. This condition prevails whenever the male weatherstrip portion 27 is not in the inserted position shown in FIGS. 1, 2, and 3 and when the female channel portion 25 is in the relationship shown in FIG. 4 prior to the spreading of same by the hand tool of the present invention, generally designated at 30 and prior to the insertion thereinto of said male weatherstrip portion 27 in the manner best illustrated in FIG. 1.

In said exemplary first form of the invention illustrated, the female weatherstrip portion 25 is effectively fastened with respect to the coach sidewall frame edge 21 by a pair of bifurcated finger portions 31 gripping the extreme edge portion of the window frame 21 therebetween in a relatively loose manner prior to insertion of the male weatherstrip portion 27 into the slot 26 of the female weatherstrip portion 25 through the use of the hand tool 30 of the present invention. Also, a similar pair of bifurcated resilient finger means 32 are positioned on the opposite side of the female weatherstrip portion 25 in a position substantially 180 degrees displaced from the position of the first-mentioned bifurcated finger means 31 and are adapted to loosely receive and engage a corresponding edge portion of the glass panel 33 of the window 23.

It should be clearly understood that the engagement, as described above, of the window frame edge 21 by the first-mentioned pair of bifurcated fingers 31 and the engagement of the window panel edge 33 by the second-mentioned pair of bifurcated finger means 32 is of a relatively loose, easily engaged and disengaged type such as to make it possible to easily position the window 23 within the window frame 21 with the second-mentioned pair of bifurcated finger means 32 engaging the window panel edge 33 and, at the time of such positioning operation, to slip the outer or first-mentioned bifurcated finger means 31 into similar engagement with the window edge 21. When this is done, it will be understood that the window 23 is in the proper relationship with respect to the window frame 21 but is not firmly fastened in said position in a manner which will permanently maintain the window 23 in said position and in a manner which will effectively seal the junction region between the outer edge of the window 23 and the corresponding edge of the window frame 21.

Such firm locking and sealing is achieved by forcing the above-mentioned male weatherstrip portion 27 into the slot 26 of the female weatherstrip portion 25 whereby to effectively cause the first-mentioned pair of bifurcated finger means 31 and the second-mentioned pair of bifurcated finger means 32 to be forcibly moved toward closed relationship whereby to positively grip and sealingly engage the corresponding window frame edge portion 21 and the corresponding glass panel edge 33 of the window 23.

It should be noted that said slot 26 might be termed a spreader slot and the male weatherstrip portion 27 might be termed a spreader element since they cooperate for spreading purposes whereby to cause the effective collapsing of said first-mentioned and second-mentioned pairs of bifurcated finger means 31 and 32, each of which might also be termed engagement channel means. The above-described locking and sealing operation, comprising the insertion of the male weatherstrip portion 27 into the spreader slot 26 of the female weatherstrip portion 25 is very effectively accomplished through the use of the novel hand tool 30 of the present invention. This insertion operation will be described in greater detail hereinafter.

The novel hand tool of the present invention, designated generally by the reference numeral 30, broadly speaking, may be said to comprise spreader means, one form of which is indicated generally at 36, and mounting means for movably mounting opposed portions of the spreader means 36 for movement between an initial closely adjacent position of said opposed portions adapted for insertion thereof through the slot 34 between the edges 28 of the slot-defining parts 35 of the female weatherstrip portion 25 into the hollow interior slot 26 thereof, and also adapted for movement of said opposed portions of the spreader means 36 into a spread-apart position for opening up said opposed channel-like slot-defining parts 35 of the female weatherstrip 25 in the manner best shown in FIGS. 1 and 2. Broadly speaking, said mounting means is indicated generally by the reference numeral 37.

In the specific form of the invention illustrated, the spreader means indicated generally at 36 includes two movably opposed substantially flat or spatulate spreader blades 38 and the mounting means indicated generally at 37 includes a first mounting member 40 carrying one of the spreader blades 38 and a second mounting member 40 carrying the other spreader blade 38, with each of the spreader blades 38 being normally initially positioned in substantially contiguous coextensive parallel transversely directed relationship with respect to the first and second mounting members 40 for insertion into the interior spreader slot 26 of the elastomeric outer female weatherstrip portion 25 whereby subsequent forcible separation of said blades 38 into a spread-apart position as shown in FIGS. 1 and 2, as a result of forcible movement of the controllably operable actuating means indicated generally at 42, will allow for the easy insertion of the male weatherstrip portion 27 through the entry slot or opening 34 into the hollow interior 26 of the spread-apart channel-like portions or slot-defining parts 35 of the female weatherstrip portions 25 in the manner best shown in FIGS. 1 and 2. This operation can comprise one continuous movement along the entire length of the female weatherstrip portion 25 since the entire tool can be merely drawn along the length of the female weatherstrip portion 25 with the spreader blades 38 maintained in the spread-apart position between the channel-like portions or slot-defining parts 35 of the female weatherstrip portion 25. This may be accomplished by manually holding the controllably operable actuating means 42 in the actuated position or may be accomplished by an automatic but controllably releasablee locking means, one exemplary form of which is indicated generally at 43, for accomplishing the same purpose.

It will be noted that, in the first exemplary form illustrated, the spreader blades 38 are provided with exteriorly positioned anti-friction roller means, indicated generally at 44, mounted for movement about axes directed substantially transversely with respect to the longitudinal direction of the tool 30 and the longitudinal direction of each of the mounting members 40 and substantially parallel to the transverse direction of the spreader blades 38. This will allow the roller means 44 to roll along the inside of the spread-apart edges 28 of the channel-like portions or slot-defining parts 35 of the female weatherstrip portion 25 in a manner such as to greatly facilitate one long continuous installation operation for installing the male weatherstrip 27 within the hollow interior 26 of the female weatherstrip portion 25. However, in certain forms of the invention, the anti-friction means may be modified somewhat or, in the simplest possible forms of the invention, may be eliminated entirely.

It should be noted that the lower one of the mounting members 40 may also be provided with a weatherstrip guide or slide loop or eye 45 adapted to slidably support the male weatherstrip 27 during an installation operation. However, in certain forms of the invention, this feature may be modified or eliminated.

In the specific exemplary first form of the invention illustrated, the controllably operable actuating means 42 comprises two rear actuating extensions 46 integrally connected with respect to the corresponding mounting members 40 at inwardly directed apex portions 48 and there being provided with pivotal connection means, indicated generally at 50, comprising a pivot pin 51 extending through the apex portions 48 whereby to pivotally connect the upper mounting member 40 and its rearward actuating extension 46, positioned on one side of the pivot pin 51, to the other or lower mounting member 40 and its rearward actuating extension 46, positioned on the other side of the pivot pin 51. This arrangement comprises what might be termed in reverse type of plier-like, controllably openable and closable, structure arranged so that forcible inward movement of the rearward actuating extensions 46 will cause forcible spreading-apart movement of the mounting members 40 and the spreader blades 38 carried thereby. This occurs against the action of the spring biasing means 52 which normally biases the actuating extensions 46 apart and, therefore, normally biases the mounting members 40 and the spreader blades 38 together.

In the specific example illustrated, the controllably disengageable locking means 43 comprises a member 53 carried by one of the actuating extensions 46 and having a toothed rack portion 54 extending through an aperture 55 in the other actuating extension 46 and cooperable with a controllably disengageable but normally spring-biased-into-engagement locking pawl or dog 56. This provides an arrangement where the actuating extensions 46 will automatically remain in any position into which they have been forcibly actuated so that the installation operation previously described may be facilitated, since it will not be necessary to manually squeeze the actuating extensions 46 during the complete installation operation of the male weatherstrip 27 into the spread-apart female weatherstrip 25. Upon completion of this installation operation, the dog or pawl 56 can be actuated against the spring 57 so as to release the teeth 54 and allow the biasing spring 52 to return the actuating extensions 46 to unactuated relative positions.

In certain forms of the invention, the tool 30 may also be provided at its forward end with weatherstrip removing hook means, such as is indicated generally at 58 in FIGS. 7–9, which is so arranged as to be capable of quickly and easily removing a previously installed male weatherstrip of the type shown at 27. This removing hook means 58 may be adjustably and/or removably mounted by fastening screw means, or the like, such as indicated at 59 for movement into an inoperative position (usually by removal thereof, such as shown in phantom at the right side of FIG. 8) or into an operative position (usually by mounting same, such as shown in solid lines at the left side of FIG. 8).

In the form illustrated, said hook means 58 includes the hook tip 60 adapted to hook over the end of a male weatherstrip portion 27, a roller 61, and a slotted portion 62 in opposition thereto whereby to allow the freed removed portion of the weatherstrip 27 to slide over the roller 61 and out through the slot 62 to facilitate easy removal thereof. However, this feature of the invention may be modified or eliminated entirely in certain forms of the invention.

FIG. 9 illustrates the modified form of the invention shown in FIGS. 7–9 inclusive, in one type of prying position which it may assume for the purpose of prying the male weatherstrip portion 27 out of the slot 26 within the female weatherstrip portion 25. It should be understood that the position illustrated in FIG. 9 is an initial position only and is not the position which the apparatus would subsequently assume during the remainder of the male-weatherstrip-element-removing operation. Furthermore, the position illustrated in FIG. 9 is not to be construed as limiting the invention in any manner whatsoever. Actually, as previously pointed out, once the male weatherstrip element 27 has had one end or a portion thereof removed from the slot 26, normally the hook tip 60 will be hooked under the male weatherstrip element 27 with the free previously removed portion of said male weatherstrip element 27 passing through the slotted portion 62 and in engagement with the roller 61 so that the hook tip 60 may be moved along the juncture of the male weatherstrip portion 27 and the slot 26 of the female weatherstrip portion 25 whereby to positively disengage them in a very simple and easy manner. This normally requires repositioning the entire hand tool means 30 from the position shown in FIG. 9 into a position with the rear handle end or actuating means 42 thereof toward the left as viewed in FIG. 9 and with the hook tip 60 hooked under the male weatherstrip portion 27 and adapted to be forcibly pulled toward the left.

FIG. 11 merely illustrates a slight modification of each of the two spreader blades 38 of the first form of the invention. As illustrated in this form of the invention, the spreader blade 38′ does not have roller means such as those illustrated at 44 in the first form of the invention, and the spreader blade 38′ may, if desired, be made of a material or have a surface of a material characterized by extremely low friction—in other words, a material having an extremely low coefficient of friction and also having an extremely smooth surface, and thus effectively providing a modified type of anti-friction means. In other forms of the invention, where the minimization of friction is not thought to be too important, the spreader blade means 38′ may merely be made of conventional material with no special emphasis on anti-friction characteristics.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

1. A weatherstrip mounting hand tool comprising: spreader means including two movably opposed spreader blades initially positioned in closely adjacent relationship for insertion into an interior locking and spreader slot positioned between and defined by a channel-shaped part of an elastomeric mounting female weatherstrip portion for subsequent forcible separation of said channel-shaped part whereby to open said interior locking and spreader slot for the forcible insertion thereinto of a correspondingly shaped male weatherstrip portion effectively comprising a spreader element adapted to maintain said interior locking and spreader slot and said channel-shaped part in a spread-apart relationship mounting means movably mounting said opposed spreader blades of said spreader means for movement between said initial closely adjacent relationship, which comprises a blade-inserting position, into a final spread-apart position for forcibly opening up said normally closed interior locking and spreader slot of said female weatherstrip portion, said mounting means being provided with controllably manually operable actuating means for actuating said mounting means and said spreader blades of said spreader means carried thereby between said initial blade-inserting position and said final spread-apart position, said mounting means comprising a first mounting member carrying a first one of said spreader blades and a second mounting member carrying a second one of said spreader blades, with said first and second mounting members being provided with pivotal connection means at a location spaced from said first and second spreader blades and having rear actuating extensions extending rearwardly beyond said pivotal connection means and effectively comprising said actuating means, whereby said rearwardly projecting actuating extensions may be manually grasped and opened or closed for correspondingly moving said first and second spreader blades into said initial blade-inserting position and said final spread-apart position, respectively; said spreader blade being provided with exteriorly positioned antifriction roller means mounted for movement about axes directed substantially transversely with respect to the longitudinal direction of the tool and substantially parallel to a transverse direction of the spreader blades; and controllably releasable and disengageable locking means effectively cooperable with respect to said mounting means and said actuating means thereof for effectively locking said spreader blades of said spreader means in said final spread-apart position until manual releasing and disengagement thereof.

2. A weatherstrip mounting hand tool as defined in claim 1, which also effectively comprises a weatherstrip demounting hand tool, wherein one of said mounting members is provided at its forward end forwardly of its spreader blade with weatherstrip-removing hook means.

3. A weatherstrip mounting hand tool comprising: spreader means including two movably opposed substantially flat spatulate spreader blades initially positioned in closely adjacent substantially contiguous coextensive parallel relationship for insertion into an interior locking and spreader slot positioned between and defined by a channel-shaped part of an elastomeric mounting female weatherstrip portion for subsequent forcible separation of said channel-shaped part whereby to open said interior locking and spreader slot for the forcible insertion thereinto of a correspondingly shaped male weatherstrip portion effectively comprising a spreader element adapted to maintain said interior locking and spreader slot and said channel-shaped part in a spread-apart relationship which is operable to effectively lock two substantially coplanar thin-sheet auxiliary edge portions in oppositely directed engagement channel means of said female weatherstrip portion, each of which is substantially perpendicularly related to said interior locking and spreader slot; mounting means movably mounting said opposed spreader blades of said spreader means for movement between said initial closely adjacent substantially contiguous coextensive parallel relationship, which comprises a blade-inserting position, into a final spread-apart position for forcibly opening up said normally closed interior locking and spreader slot of said female weatherstrip portion, said mounting means being provided with controllably manually operable actuating means for actuating said mounting means and said spreader blades of said spreader means carried thereby between said initial blade-inserting position and said final spread-apart position; spring biasing means normally effectively biasing said spreader blades of said spreader means into said initial blade-inserting position but effectively cooperable therewith in a manner such as to allow forcible spreading apart movement thereof toward said final spread-apart position in response to forcible manual operation of said actuating means in a corresponding manner; said mounting means comprising a first mounting member carrying a first one of said spreader blades and a second mounting member carrying a second one of said spreader blades, with said first and second mounting members being provided with pivotal connection means at a location spaced from said first and second spreader blades and having rear actuating extensions extending rearwardly beyond said pivotal connection means and effectively comprising said actuating means, whereby said rearwardly projecting actuating extensions may be manually grasped and opened or closed for correspondingly moving said first and second spreader blades into said initial blade-inserting position and said final spread-apart position, respectively, said mounting means and said actuating means comprising two substantially V-shaped members each having an inwardly directed apex portion pivotally connected to the other apex portion whereby to comprise said pivotal connection means and thereby defining an effectively reversed plier-like controllably openable and closable structure having each corresponding individual movable spreader blade and each corresponding rearwardly projecting actuating extension effectively connected thereto lying on the corresponding same side of the pivotal connection means whereby movement of said actuating extensions toward each other causes spreading-apart movement of said two spreader blades and whereby movement of said actuating extensions away from each other causes movement of said spreader blades toward each other; each of said spreader blades being provided on its outer surface with a plurality of antifriction roller means and similarly transversely directed mounting axle means therefor whereby to mount each of said roller means for movement about axes directed substantially transversely with respect to the longitudinal direction of the tool and substantially parallel to a transverse direction of the spreader blades; and including controllably releasable and disengageable locking means effectively cooperable with respect to said actuating extensions of said actuating means thereof for locking said spreader blades of said spreader means in said final spread-apart position until manual releasing and disengagement thereof to allow said spring biasing means to forcibly return said actuating means and said mounting means into said initial blade-inserting position.

4. A weatherstrip mounting hand tool as defined in claim 3, which also effectively comprises a weatherstrip demounting hand tool, wherein one of said mounting members is provided at its forward end forwardly of its spreader blade with controllably operatively positionable weatherstrip-removing hook means.

References Cited

UNITED STATES PATENTS

| | | | |
|---|---|---|---|
| 544,268 | 8/1895 | Unsinger et al. | 29—235 X |
| 1,960,878 | 5/1934 | Rush | 29—221 |
| 2,189,138 | 2/1940 | Eichner | 29—235 X |
| 2,267,660 | 12/1941 | McPhail | 29—270 X |
| 2,486,666 | 11/1949 | Maudlin | 29—270 |
| 2,533,367 | 12/1950 | Gruszecki | 29—270 |
| 3,081,532 | 3/1963 | Kesel et al. | 29—235 |

WILLIAM FELDMAN, *Primary Examiner.*

J. C. PETERS, *Assistant Examiner.*